Patented Oct. 31, 1939

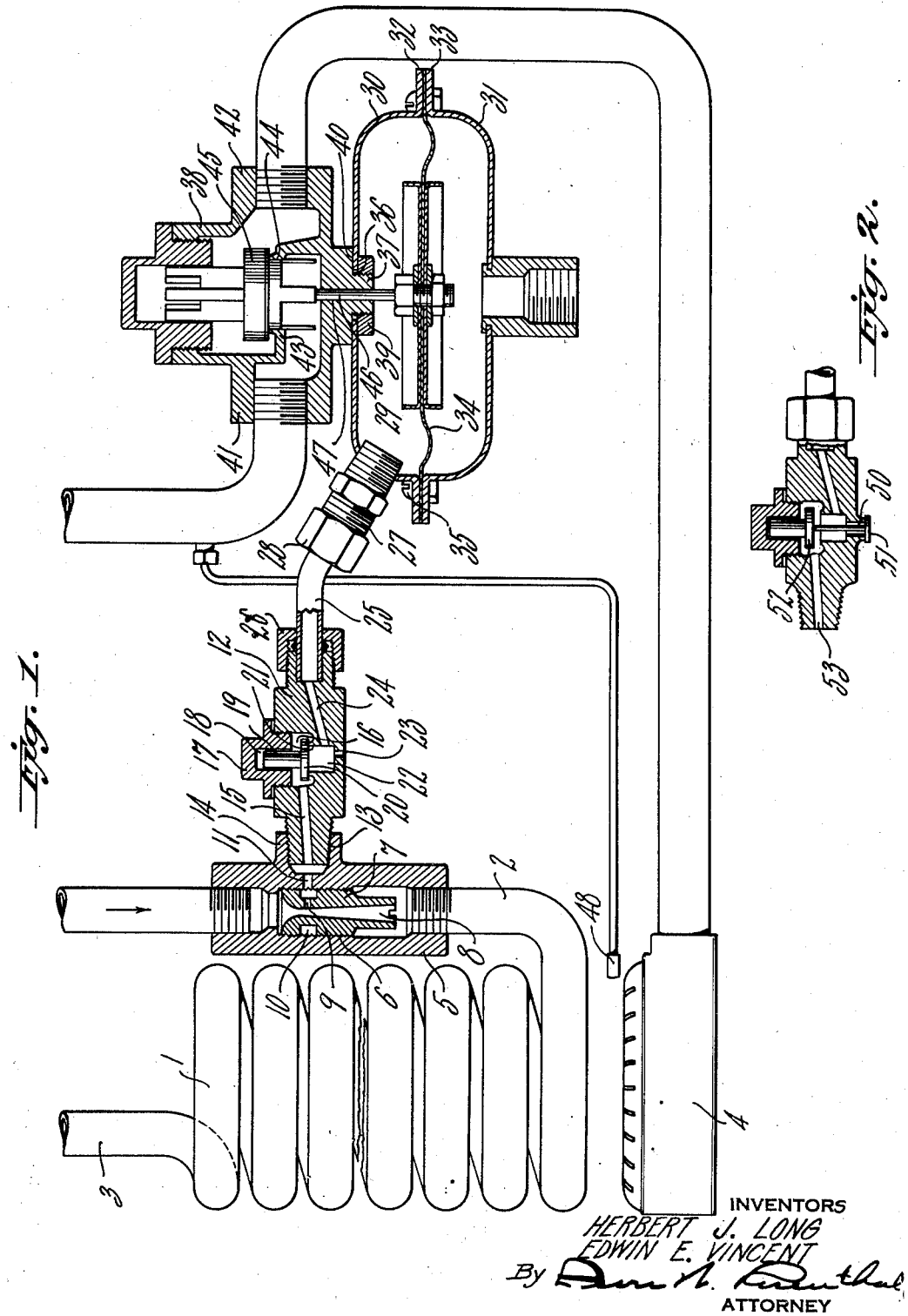

2,177,731

UNITED STATES PATENT OFFICE 2,177,731

CONTROL SYSTEM FOR LIQUID HEATERS

Herbert J. Long and Edwin E. Vincent, Springfield, Mass., assignors to American Bosch Corporation, a corporation of New York Application September 25, 1937, Serial No. 165,625

3 Claims. (Cl. 236—25)

This invention relates to a fuel control system and more particularly to a system for controlling the flow of gas to an instantaneous type water heater.

In water heaters of this type as heretofore constructed, a piston or other movable element was exposed to the pressure in the waterline and connected to actuate a valve in the gas line in accordance with variations in the pressure or rate of flow of the water.

In all such arrangements, however, some movable member was subjected directly to the pressure of the water, and therefore it was necessary to make this member of rugged construction and of materials which would not corrode. Even when so constructed, solid matter deposited from the water upon the movable member or upon surfaces in contact therewith would occasionally cause the member to stick and if such sticking occurred when the gas valve was in open position, gas would continue to be supplied to the burner even though no water was being withdrawn from the system. Such failures were of course ruinous to the heating element. These constructions also involved wearable moving parts, and particularly stuffing boxes, which are a constant source of trouble due to leakage and friction.

It is a primary object of the present invention to avoid the above mentioned defects and provide a control system for instantaneous type heaters in which a control member opens or closes a valve for supplying fuel to a burner in response to the flow of water through the heater but in which there is no moving part subjected to the pressure or corrosive effect of the water.

It is a further object of this invention to provide a device of this type which is of simple construction and which therefore can be easily manufactured at a relatively low cost.

To these ends the invention provides for the creation of a sub-atmospheric pressure in a medium such as air by an injector effect of the water flowing through the system when a hot water tap is opened without the interposition of moving parts in or exposed to the water and the utilization of this negative pressure for controlling the actuation of a fuel supply valve.

The above and other objects and features of the invention will be apparent to those skilled in the art from a consideration of the following detailed description taken in conjunction with the accompanying drawing, in which:

Fig. 1 is a view partly diagrammatic of the fuel control system applied to an instantaneous water heater; and Fig. 2 shows a modified form of check and vent control.

Referring to the drawing, reference numeral 1 indicates a coil forming a heating element having an intake connection 2 and a discharge connection 3 which connections form a water line for the supply of cold water to and the discharge of heated water from the heating element 1. A gas burner 4 is provided beneath the heating element 1. A fitting 5, which as shown is provided in the intake connection 2 but which may be positioned at any point in the water line as convenient, is provided with an internally threaded bore 6 adapted to accommodate an externally threaded plug 7. The plug 7 is adapted to close the bore 6 except for a Venturi throat 8 which extends longitudinally through the plug 7 and flares sharply toward the intake end of the fitting 5 and expands gradually in the opposite direction, that is toward the discharge end of the fitting 5. At a point which is slightly toward the discharge side of the most contracted portion of the throat 8, a lateral passage 9 extends from the passage 8 to an annular chamber 10 formed by a groove in the periphery of the plug 7. A lateral passage 11 in the fitting 5 provides communication between the annular chamber 10 and a check valve housing 12. The housing 12 is provided with an externally-threaded end portion 13 adapted to be inserted in an internally-threaded annular boss 14 surrounding the passage 11 and a passage 15 in the housing 12 provides communication between the passage 11 and a chamber 16 in the housing. A cap 17 provides a closure for the chamber 16 and also provides a bore 18 forming a guide for the stem 19 of a check valve 20. The check valve 20 normally rests on an annular seat 21 and when so seated closes comunication between the chamber 16 and a chamber 22 formed in the housing 12 immediately below the valve 20. A small passage 23 provides a vent between the chamber 22 and the atmosphere and a passage 24 provides communication between the chamber 22 and a tube 25 which is connected to the housing 12 by means of a nipple nut 26. The tube 25 is connected by suitable nipple 27 and nut 28 to the upper portion of a diaphragm chamber 29. The chamber 29 is formed by two cup-shaped housing members 30 and 31 which are provided with opposed peripheral flanges 32 and 33 between which a diaphragm 34 of flexible material is adapted to be clamped and held by screw bolts 35. The upper housing member 30 has a central opening 36 adapted to slip over an annular boss 37 extending from a gas valve housing 38. The boss 37 is externally threaded and a nut 39 is adapted to clamp the housing 30 securely to a flat shouldered surface 40 provided on the housing 38 surrounding the boss 37. The housing 38 is provided with a suitable inlet connection 41 and a discharge connection 42. A partition 43 having an opening 44 provides a communication between the intake and discharge sides of the housing. A valve 45 is adapted to normally close the opening 44 and a stem 46 extending through a lateral bore 47 in the housing 38 is connected to the diaphragm 34.

In the operation of the form above described, assuming that any tap connected with the discharge connection 3 is open, water flowing through the Venturi throat 8, so that regardless duction in pressure in the lateral passage 9. This reduction of pressure causes the valve 12 to open and thus reduces the pressure in the chamber immediately below the valve and likewise in the upper portion of the diaphragm chamber 29 to which it is connected. The reduction in pressure in the chamber 29 causes the diaphragm 34, which is exposed to atmospheric pressure on its opposite side, to rise opening the main gas valve 45. Gas now flows to the main burner 4, is ignited by a pilot 48 adjacent thereto, and the water flowing through the heating element 1 is heated. The quantity of gas will be proportionate to the rate of flow of water through the Venturi throat 8, so that regardless of the rate of flow the water will be heated to approximately the same temperature, whether a large or a small quantity of water is being withdrawn. It will be obvious that a small drip or leak at the hot water tap will be insufficient to produce the necessary suction at the Venturi throat and that in such cases no gas will be supplied to the burner. On closing of the hot water tap and the consequent cessation of flow through the heating element, the pressure in the lateral passage 9 rises to the same pressure as that within the water line and this pressure closes the check valve 26. The pressure within the chamber 22 below the check valve is soon equalized through the vent opening 23 and thus the pressure in the upper portion of the diaphragm chamber 29 soon equals the atmospheric pressure to which the lower side of the diaphragm is exposed. The diaphragm falls closing the gas valve 45 cutting off the flow of gas to the burner. It will thus be seen that the invention provides a structure in which the valve actuating mechanism is not subjected to the pressure within the water line and is subjected only to a fluid pressure equal to or below atmospheric pressure.

The form of the invention shown in Fig. 2 is similar to the above except that the vent 50 is not continuously open. A valve 51 attached to a check valve 52 is raised upon the opening of the check valve in response to the suction in the passage 53 to close the vent orifice 50 and therefore maintain a higher degree of vacuum in the upper portion of the diaphragm chamber than would otherwise be the case. Upon closure of the check valve, the vent is open thereby providing a relatively large vent orifice which permits immediate equalization between the pressure in the diaphragm chamber and the diaphragm and thus effects an immediate closure of the valve controlling the supply of gas to the main burner.

The above description of the invention will be sufficient to enable those skilled in the art to construct and use the same and to make various embodiments and modifications thereof within the scope of the appended claims.

Having described the invention, what is claimed as new is:

1. A water heater including a burner, an element heated by said burner, connection for the supply of liquid to and the discharge of liquid from said element, a chamber containing a fluid other than said liquid, a tube forming a connection between said chamber and one of said liquid connections and means whereby the flow of liquid through said connection generates a reduction in the pressure of the fluid in said tube and said chamber, a check valve in said tube for preventing the entry of said liquid to said fluid chamber, and means responsive to the pressure variations in said chamber between atmospheric and sub-atmospheric pressures for controlling the flow of fuel to said burner.

2. A water heater including a burner, an element heated by said burner, a water line in which said element is connected, an air chamber, means including a venturi in said water line and a tube connecting said venturi and said air chamber for creating a sub-atmospheric pressure in said air chamber by means of the flow of liquid through said water line, means responsive to the pressure variations in said air chamber between atmospheric and sub-atmospheric pressures for controlling the flow of fuel to said burner, a check valve in the tube connecting said air chamber and water line, an air vent in said air chamber, and a valve connected to said check valve for controlling said vent.

3. A water heater including a burner, an element heated by said burner, connections for the supply of liquid to and the discharge of liquid from said element, an air chamber, means for creating a sub-atmospheric pressure in said air chamber in response to the flow of liquid through said element, means responsive to the pressure variations in said air chamber between atmospheric and sub-atmospheric pressures for controlling the flow of fuel to said burner, means for preventing the flow of said liquid to said air chamber, and a vent in said air chamber.

HERBERT J. LONG.
EDWIN E. VINCENT.